US009016322B2

(12) United States Patent
Vogt et al.

(10) Patent No.: US 9,016,322 B2
(45) Date of Patent: Apr. 28, 2015

(54) DEVICE FOR RENOVATING A PIPE

(75) Inventors: Jörg Vogt, Bochum (DE); Tim Nieding, Bad Hersfeld (DE); Axel Spering, Aachen (DE)

(73) Assignee: I.S.T. Innovation Sewer Technologies GmbH, Bochum (DE)

( * ) Notice: Subject to any disclaimer, the term of this patent is extended or adjusted under 35 U.S.C. 154(b) by 23 days.

(21) Appl. No.: 13/820,809

(22) PCT Filed: Sep. 5, 2011

(86) PCT No.: PCT/EP2011/004458
§ 371 (c)(1),
(2), (4) Date: May 13, 2013

(87) PCT Pub. No.: WO2012/031731
PCT Pub. Date: Mar. 15, 2012

(65) Prior Publication Data
US 2013/0219640 A1    Aug. 29, 2013

(30) Foreign Application Priority Data

Sep. 6, 2010    (DE) .......................... 10 2010 044 465

(51) Int. Cl.
*F16L 55/34* (2006.01)
*F16L 55/48* (2006.01)
*F16L 55/26* (2006.01)

(52) U.S. Cl.
CPC ............... *F16L 55/48* (2013.01); *F16L 55/265* (2013.01)

(58) Field of Classification Search
CPC .... F16L 55/1651–55/1653; G05B 2219/45233
USPC .......................... 138/98, 97; 405/184.1, 156
See application file for complete search history.

(56) References Cited

U.S. PATENT DOCUMENTS

| 4,648,454 | A  | * | 3/1987  | Yarnell ......................... 166/297 |
| 5,044,824 | A  | * | 9/1991  | Long et al. ..................... 405/156 |
| 5,878,783 | A  | * | 3/1999  | Smart .............................. 138/93 |
| 6,621,516 | B1 | * | 9/2003  | Wasson et al. ................... 348/84 |
| 7,131,791 | B2 | * | 11/2006 | Whittaker et al. ......... 405/184.2 |
| 7,720,570 | B2 | * | 5/2010  | Close et al. .................... 700/245 |
| 2006/0074525 | A1 | * | 4/2006 | Close et al. .................... 700/245 |
| 2008/0264451 | A1 | * | 10/2008 | Shimamura et al. ....... 134/22.11 |

\* cited by examiner

*Primary Examiner* — Patrick F Brinson
(74) *Attorney, Agent, or Firm* — Berliner & Associates

(57) ABSTRACT

The invention relates to a device (1) for renovating a pipe, the latter being provided with at least one opening arranged in the wall of the pipe, said device (1) having a base unit (2) that can be introduced into the pipe, a clearing unit (3) that is movable relative to the base unit (2), and an electronic sensor arrangement for detecting the instantaneous position of the clearing unit (3) relative to the base unit (2). To make available a novel device (1) for renovating a pipe provided with at least one opening arranged in the wall of the pipe, which device permits reliable and inexpensive repair of the pipe, the invention proposes that at least one electronic inclination sensor is arranged on the base unit (2).

3 Claims, 1 Drawing Sheet

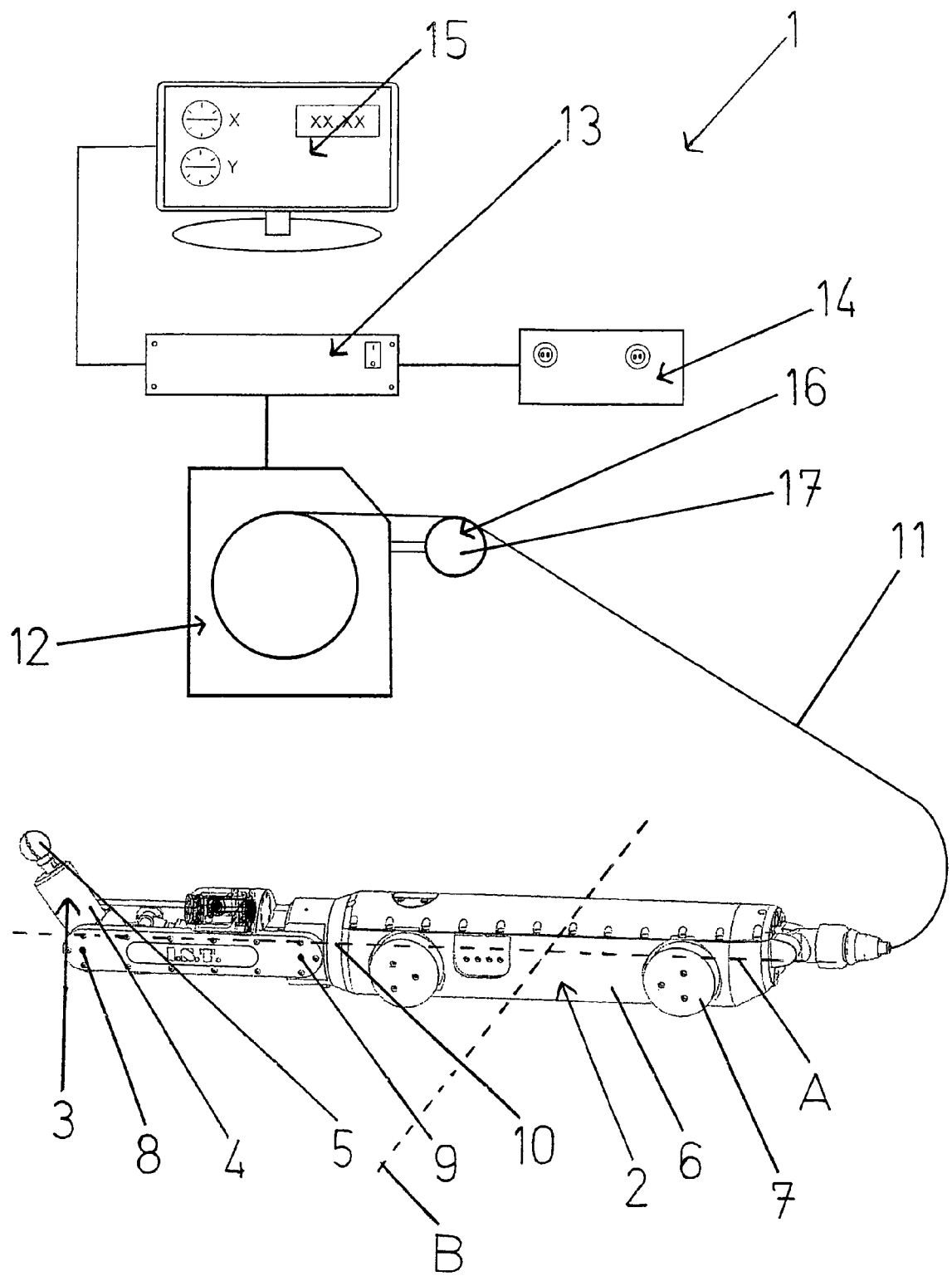

DEVICE FOR RENOVATING A PIPE

The invention relates to a device for renovating a pipe, the latter being provided with at least one opening arranged in the wall of the pipe, said device having a base unit that can be introduced into the pipe, a clearing unit that is movable relative to the base unit, and an electronic sensor arrangement for detecting the instantaneous position of the clearing unit relative to the base unit.

Devices of a generic nature are utilized, for example, for renovating sewer pipes. Accordingly, a sewer pipe to be renovated is provided with a sealing inner lining, also called inliner. With this working step, openings existing on the pipe and which may serve as intake or drain, are sealed with the inliner, thus calling for clearing the openings again after having fined the pipe.

To find sealed openings after having lined the sewer pipe, the positions of the openings are picked-up and recorded conventionally prior to lining the pipe. To this effect, the base unit is moved up to that section of the pipe where an opening is arranged on the pipe, and the distance covered by the base unit in axial direction in the pipe is picked-up and recorded. At the same time, the clearing unit is moved relative to the base unit up to the opening, picking-up and recording the relative position of the clearing unit versus the base unit.

Upon lining the pipe with the inliner, the base unit is moved back based on the distance covered, picked-up and determined when picking-up the position of the opening to that section of the pipe where the pipe opening to be cleared is arranged. Subsequently the clearing unit is moved to that relative position versus the base unit which had been picked-up and recorded when picking-up the position of the opening. In such a configuration of the device for renovating the pipe, material of the inliner is then removed by means of the clearing unit in order to clear the opening.

Often it occurs that whilst clearing the opening, the base unit fails to take the same relative position versus the horizontal plane as that taken when picking-up the opening position prior to pipe lining. However, if the relative position of the base unit versus the horizontal plane differs from that taken on capturing the position of the opening, then the clearing unit is indeed brought into the predefined relative position versus the base unit, but in such a case the positioning of the clearing unit does not match the position of the opening to be cleared. If material of the inner lining is removed in this configuration of the device at a non-desired position that fails to match an opening, a leaky spot on the inliner is thus created and the desired result of the renovation is not achieved. Instead, time-devouring and costly patch-up work will be required, thus making such a conventional pipe renovation very expensive. These problems arise in particular because the base unit needs to be moved in longitudinal direction of a pipe with an oval or circular cross-section and hence it is not moved on a horizontally configured plane surface. Still more severe is the problem encountered when clearing openings arranged in a pipe curvature.

Against this background, it is the object of the present invention to provide a novel device for renovating a pipe provided with at least one opening arranged in a pipe wall, which device permits preventing these a.m. disadvantages so that renovating the pipe can be performed in a reliable and low-cost manner.

This task is fulfilled by a device of the a.m. nature in that it is comprised of at least one electronic inclination sensor arranged on the base unit.

The inventive arrangement of at least one inclination sensor on the base unit permits recording the instantaneous relative position of the base unit versus the horizontal plane and thus considering it for the renovation. The relative position of the clearing unit versus the base unit recorded when picking-up the position of the opening can consequently be correlated to the relative position of the base unit versus the horizontal plane given at that moment. The absolute position of the opening can hereby be ascertained and determined. Furthermore, the relative position of the base unit versus the horizontal plane can also be taken into account when clearing the opening, i.e. in such a manner that the relative position versus the horizontal plane taken for clearing the opening is correlated to the predefined absolute position of the opening in order to determine the relative position which the clearing unit has to take versus the base unit in order to clear the opening without removing material from the inliner in the surroundings of the opening. The inventive configuration for renovating a pipe provided with at least one opening arranged in the pipe wall thus permits realizing a reliable and low-cost pipe renovation.

Two electronic inclination sensors are preferably arranged on the base unit, thereof one recording inclinations of the base unit about an axis arranged in parallel to the pipe longitudinal axis and the other recording inclinations of the base unit about a transverse axis arranged horizontally and transversely to this axis.

In accordance with an advantageous embodiment of the present invention, the device is comprised of an electronic evaluation unit equipped configured for evaluating the data generated by the electronic sensor unit considering the data generated by the electronic inclination sensor. With this evaluation of the data generated by the electronic sensor unit concerning the relative position of the clearing unit taken in a given case versus the base unit, the absolute position of the opening is determined. For example, this absolute position can be saved in a retrievable memory and thus be registered In another advantageous embodiment of the present invention it is provided for that the electronic evaluation unit is configured for controlling the movement of the clearing unit relative to the base unit, considering the data generated by the electronic inclination sensor. To this effect, the memorized absolute position of the opening is retrieved and correlated to the data generated by the electronic inclination sensor. Thereby it is feasible to determine the ideal relative position of the clearing unit versus the base unit for clearing the opening. Subsequently the clearing unit can be moved exactly to the determined ideal relative position.

In accordance with another advantageous embodiment of the present invention, the device is comprised of a facility for electronic recording of the instantaneous axial relative position between the pipe and the base unit. It is thereby ensured that after having lined the pipe, the base unit can again be moved exactly to that axial relative position between the pipe and the base unit in which the position of the opening has been recorded prior to lining the pipe.

It is furthermore deemed advantageous if the evaluation unit can be arranged separated from the base unit and the clearing device outside the pipe and connected to the base unit, to an operating unit as well as to a display unit. Via the operating unit, the base unit and the movements of the clearing unit relative to the base unit can be controlled by an operator from outside the pipe in the desired manner. To be able to perform this controlling exactly, data generated by the electronic sensor unit and/or the electronic inclination sensor are displayed on the display unit, for example. Moreover, it is feasible to visualize an absolute coordinate system in which the absolute position of an opening that can be determined with the inventive device is registered.

Further advantages and features of the present invention are elucidated by way of the practical example for the inventive device as shown in the FIGURE attached hereto, where:

FIG. 1: shows a schematic representation of a practical example of the inventive device.

FIG. 1 schematically shows a practical example for the inventive device 1 for renovating a pipe not illustrated here, said pipe provided with at least one opening arranged in the pipe wall. The device 1 is comprised of a base unit 2 insertable into the pipe and a clearing unit 3 movable relative to the base unit 2. The clearing unit 3 is comprised of a motor 4 as well as a milling head 5. Mounted to the base body 6 of base unit 2 are four wheels 7, thereof only two being illustrated in FIG. 1 and by means of which the base unit 2 is movable in longitudinal direction of the pipe.

The clearing unit 3 is movable relative to base unit 2, for the purpose of which the clearing unit 3 is connected via joints 8 and 9 to a part 10 of base unit 2, wherein part 10 is pivoted about the longitudinal axis A of base unit 2 at base unit 2. The relevant angular positions at the joints 8 and 9 as well as those of part 10 versus the remaining base unit 2 are picked-up by means of appropriately arranged sensor elements of an electronic sensor device of the device 1. The instantaneous position of the clearing unit 3 versus the base unit 2 can be picked-up hereby.

Arranged in the base body 6 of base unit 2 are two electronic inclination sensors not illustrated here more closely, which can pick-up inclinations of the base unit 2 about its longitudinal axis A as well as about a horizontal transverse axis B arranged perpendicularly to the longitudinal axis A.

The base unit 2 is connected to an electronic evaluation unit 13 via an electrical cable 11 unreeled from a cable drum 12 as the basis unit 2 is moved into the pipe. Connected to the electronic evaluation unit 13 is an operating unit 14 as well as a display unit 15. By means of the operating unit 14, the device 1 can be controlled by an operator on the basis of the information displayed by the display unit 15. The inclination of the base unit 2 relative to the axes A and B is displayed on the left side of the display unit.

The length of the cable 11 unreeled from the cable drum 12 as the base unit 2 is moved into the pipe is picked-up by means of the device 16. For this purpose, the device 16 is comprised of a wheel 17, the wheel tread of which is in contact with the cable 11 and which is thus rotated about a distinct angle of rotation when unreeling the cable 11 from the cable drum 12. This angle of rotation is picked-up in the course of an angle measurement and it allows for drawing conclusions on the relevant length of the cable 11 unreeled from the cable drum 12 and thus on the distance covered by the base unit 12 in the pipe.

The practical example described based upon this FIGURE serves explanatory purposes and is non-restrictive.

The invention claimed is:

1. Device (1) for renovating a pipe, the latter being provided with at least one opening arranged in the wall of the pipe, said device (1) having a base unit (2) that can be introduced into the pipe, a clearing unit (3) that is movable relative to the base unit (2), and an electronic sensor arrangement for detecting the instantaneous position of the clearing unit (3) relative to the base unit (2) including
   at least one electronic inclination sensor arranged on the base unit (2) for recording the instantaneous relative position of the base unit versus the horizontal plane, a retrievable memory for determining the absolute position of the opening and an electronic evaluation unit configured for evaluating the data generated by the electronic sensor unit considering the data generated by the electronic inclination sensor and for determining the absolute position of the opening and for saving the position in the memory and for controlling the movement of the clearing unit relative to the base unit while clearing by retrieving the absolute position of the opening which is saved in the memory by considering the data generated by the electronic inclination sensor.

2. Device (1) as defined in claim 1, further comprising a unit for electronic recording of the instantaneous axial relative position between the pipe and the base unit (2).

3. Device (1) as defined in claim 1 or 2, wherein the electronic evaluation unit (13) can be arranged separated from the base unit (2) and the clearing unit (3) outside the pipe and is connected with an operating unit (14), the base unit (2) and a display unit (15).

* * * * *